United States Patent
Baerveldt

Patent Number: 5,935,695
Date of Patent: Aug. 10, 1999

[54] JOINT FILLER

[75] Inventor: Konrad Baerveldt, Thornhill, Canada

[73] Assignee: Emseal Corporation, Mississauga, Canada

[21] Appl. No.: 08/960,078

[22] Filed: Oct. 24, 1997

Related U.S. Application Data

[63] Continuation of application No. 08/402,316, Mar. 10, 1995, abandoned, which is a continuation of application No. 08/158,805, Nov. 24, 1993, abandoned, which is a continuation of application No. 07/719,672, Jun. 21, 1991, abandoned, which is a continuation of application No. 07/510,059, Apr. 17, 1990, abandoned.

[30] Foreign Application Priority Data

Apr. 19, 1989 [CA] Canada .................. 597166

[51] Int. Cl.⁶ ................................. B65D 53/00
[52] U.S. Cl. .................... 428/218; 277/654; 404/64; 404/66; 428/314.4; 428/314.8; 428/317.1; 428/317.3; 428/317.5; 428/317.7
[58] Field of Search ............... 428/57, 58, 314.4, 428/314.8, 316.6, 317.1, 317.3, 317.5, 317.7, 322.7, 218; 404/64, 66; 277/228, 654

[56] References Cited

U.S. PATENT DOCUMENTS

| | | | |
|---|---|---|---|
| 3,582,095 | 6/1971 | Bogaert | 428/316.6 |
| 3,944,704 | 3/1976 | Dirks | 428/316.6 |
| 4,401,716 | 8/1983 | Tschudin-Mahrer | 428/58 |
| 4,558,875 | 12/1985 | Yamaji et al. | |
| 4,615,411 | 10/1986 | Breitscheidel et al. | 428/316.6 |
| 4,839,223 | 6/1989 | Tschudin-Mahrer et al. | 428/57 |
| 4,977,018 | 12/1990 | Irrgeher et al. | 428/316.6 |
| 5,130,176 | 7/1992 | Baerveldt | 428/316.6 |

FOREIGN PATENT DOCUMENTS

| | | | |
|---|---|---|---|
| 0212884 | 3/1987 | European Pat. Off. | |
| 317833 | 5/1989 | European Pat. Off. | 428/316.6 |
| 0317833 | 5/1989 | European Pat. Off. | |
| 388592 | 6/1965 | Switzerland | |
| 378357 | 7/1969 | Switzerland | |
| 1169388 | 11/1969 | United Kingdom | |
| 1211542 | 11/1970 | United Kingdom | |
| 1411148 | 10/1975 | United Kingdom | |
| 1567016 | 5/1980 | United Kingdom | |
| 2181093 | 4/1987 | United Kingdom | |

Primary Examiner—Jenna Davis
Attorney, Agent, or Firm—Michael N. Meller

[57] ABSTRACT

A joint filler for use in joints between structural elements comprising: at least one layer of a substantially non-compressible, moisture blocking material; at least two layers of a compressible and resilient, moisture blocking material, each layer being in surface to surface contact with a layer of non-compressible material; the layers of material are combined to form a strip of interleaved compressible and non-compressible layers, and in an uncompressed state thicker than a joint.

29 Claims, 1 Drawing Sheet

JOINT FILLER

This is a file wrapper continuation application of U.S. Ser. No. 08/402,316 filed Mar. 10, 1995, now abandoned, which is a file wrapper continuation application of U.S. Ser. No. 08/158,805 filed Nov. 24, 1993, now abandoned, which, in turn, is a file wrapper continuation application of U.S. Ser. No. 07/719,672 filed Jun. 21, 1991, now abandoned which, in turn is a file wrapper continuation application of U.S. Ser. No. 07/510,059 filed Apr. 17, 1990 now abandoned.

The present invention relates to joint fillers for use with single sand multi-component, cold applied, chemically curing elastomeric joint sealants for joint seal applications in buildings and related adjacent areas, such as plazas, decks and pavements for vehicular or pedestrian use.

Generally, joint fillers are divided, by the American Society for Testing and Materials (ASTM) into two types. ASTM Type A are, in general, flexible closed cell plastic or sponge rubber. They are used to control the depth of sealant used at the top of a joint.

ASTM Type B fillers, on the other hand, are relatively more rigid materials such as elastomeric tubing of neoprene, butyl or EPDM. They can be used as temporary joint seals and provide some weather-proofing in the event of sealant failure.

The joint filler of the present invention is constructed as a modified hybrid form of Type A filler, but exhibits the desirable characteristics of Type B fillers.

The use of joint fillers is, in general, well known. The function of joint fillers are, in general terms, as follows:

i) it controls the depth of sealant in the joint;

ii) it permits full wetting of the intended interface when tooled;

iii) it acts as a temporary joint seal for weather protection when conditions are unsuitable for immediate sealant application;

iv) it can act as a secondary sealant barrier in the event of primary sealant failure;

v) it supports the sealant in the narrower horizontal deck joint subject to pedestrian or vehicular traffic; and vi) it determines the cross-sectional shape of the installed sealant.

Similarly, there are a number of properties which are necessary or desirable in a both sealant and a joint filler and they include:

a) the ability to create an effective water seal;

b) the ability to expand and contract, as the joint widens or narrows in response to environmental or other conditions, while maintaining an effective seal against the sides of the joint;

c) the ability to flex in every direction, as the joint flexes due to structural conditions, loading, or environmental conditions, while maintaining an effective seal against the sides of the joint;

d) aesthetically acceptable appearance;

e) the capability of being installed in a joint by fairly unskilled labour;

f) long life;

g) the ability to adhere to numerous surface materials, such as concrete, steel, or aluminum without extensive or expensive surface preparations; and h) the ability to fit into joints of a large variety of widths.

The present invention, however, provides a joint filler which has the desirable properties for a joint filler together with some inherent properties of a sealant. In addition, the invention when used as a joint filler together with a sealant has the ability to reduce the quantity of sealant necessary to seal the joint by altering the sealant configuration normally considered ideal.

In a broad aspect, the present invention relates to a joint filler for use in joints between structural or other elements comprising: (a) at least one layer of a substantially non-compressible, flexible moisture blocking material; (b) at least two layers of a flexible compressible and resilient, moisture blocking material, each said layer being in surface to surface contact with a layer of said non-compressible material; said layers of material being combined to form a strip of interleaved compressible and non-compressible layers, and being in an uncompressed state thicker than a said joint.

In drawings which illustrate the present invention by way of example:

Figure 1:
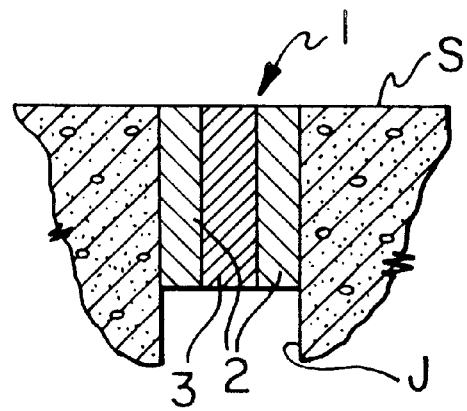
FIG. 1 is an end view of a first embodiment of the present invention.

Referring first to FIG. 1, the present invention in its most elementary form is illustrated. The sealant strip 1 of the present invention fits inside a joint having interior side surface J and an exterior surface S.

The strip 1 of the present invention is composed of interleaved layers of compressible foam 2 and substantially non-compressible foam 3. The compressible foam 2 and substantially non-compressible foam 3. The non-compressible layer 3 or layers are typically a closed cell foam which is moisture proof and inexpensive. Polyethylene foam or ethyl vinyl acetate foam are examples of suitable non-compressible layer materials. Other suitable materials, such as cellular, flexible, plastic extrusions will be apparent to the skilled practitioner.

In contact with the sides J of the joint are the compressible layers 2 of the sealant strip of the present invention. The compressible layers are formed from flexible open celled foam which has been impregnated with an adhesive. Polyurethane open celled foam is an example of a suitable material. Other suitable open celled foams include those utilizing polyvinyl copolymers, natural or synthetic rubbers or viscose sponge. A commercially available foam of the type suitable for use in the present invention is 'Polyester Foam Grade 6273', from General Foam Corporation, Paramus, N.J., U.S.A.

As noted, the open celled foam of the compressible layers 2 is impregnated with adhesive. The ratio, by weight, of foam to adhesive, is generally in the range of 1:4–1:5 (foam to adhesive). The correct quantity of adhesive to be used in conjunction with a particular foam will be a matter of design choice for the skilled workman. The parameters which must be considered include adhesive density (i.e. specific gravity) and viscosity, apparent foam density, cell count of the foam, elasticity of the foam, indentation force deflection of the foam, air permeability of the foam and chemical compatibility of the foam with the chosen adhesive. However, this ratio may be increased or decreased, depending on relative impregnated foam weight and the final degree of compression required to increase the density of the product to the density necessary to obtain weathertight characteristics. Too much adhesive will tend to lead to bleeding of the adhesive from the foam upon compression at elevated temperatures. Conversely, it will lead to low recovery and loss of elasticity at reduced temperature. The adhesive chosen should be one that in its cured state continues to exhibit elastic and adhesive properties. Suitable adhesives are chlorinated paraffin waxes, natural and synthetic waxes, acrylics, latexes, styrenes, vinyls, bitumens (asphalts), natural and synthetic resins, and copolymers of the foregoing. A commercially available impregnated foam which has been found to be exemplary for use in the present invention is GREYFLEX™, available from Emseal Corporations Mississauga, Ontario.

Before insertion into a joint, the sealant strip of the present invention is packaged in a compressed state by laterally squeezing the compressible layers 2 to about 10–25% of their uncompressed thickness. The product is then wound into rolls or packaged sandwiched between layers of hard material like hardboard, and wrapped in shrink-wrap plastic. In either case, it is important that the product be delivered to a job side in its compressed state. The present invention, when installed in a joint, at usual working temperature of the joint, should be permitted to expand from its compressed packaged state to a state wherein the open celled foam layers are in contact with the joint substrate on either side J. At this degree of compression, in use, the open celled foam layer will exhibit sufficient water resistance to be useful as a sealant without the need for a thick waterproof membrane over top at the surface S of the joint. Moreover, the foam 2 will still be able to expand a considerable distance without losing its waterproof nature, and without losing any hold on the side J of the joint, as the joint expands. It will also be able to compress somewhat without being damaged.

Figure 2:
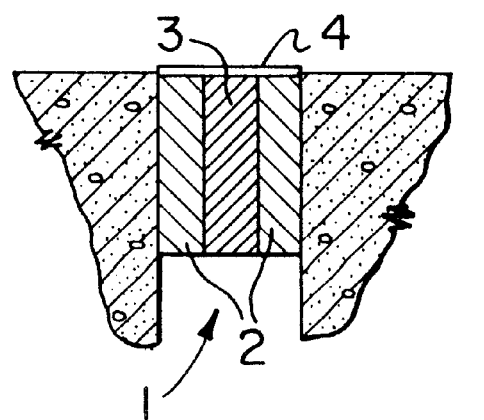
FIG. 2 is an end view of a modified form of the embodiment of FIG. 1, provided with an external membrane.

Referring to FIG. 2, it will be seen that a sealant membrane 4 may be provided over the top edge of the strip 1 of the present invention, flush with the top surface S of a joint or slightly recessed into the joint and rising to the edges thereof. This membrane need not be very thick, (2 to 2.5 mm) as it does not have to lend additional waterproofing capability to the strip of the present invention. However, it is useful for it to be provided, as it can add a suitable colour to the joint filler strip, and will provide the top surface of the joint with a closed cell uniform appearance. Moreover, the membrane sealant will prevent entry of foreign materials into the open celled foam of the strip of the present invention, and thereby extend the life of the strip of the present invention. A suitable material for the membrane sealant is Dow Corning Dow 790 RTV Silicone Sealant. This sealant is applied as a viscous liquid over the strip of the present invention after the strip is installed, and then it is permitted to cure. Other suitable top coats include thin layers of RTV (room temperature vulcanizing) silicone rubbers, polyurethanes, acrylics, vinyls, synthetic and natural rubbers, polysulphides, chemically curing elastomeric joint sealants, thermo-plastics, thermo-rubbers, polymers and copolymers of the foregoing, and so on—as will be obvious to one skilled in the art. The most important feature of the membrane sealant chosen will be water impermeability, the ability to be bonded to the outer surface layers of the open celled foam, so as to display elastic properties equivalent to those of the open-celled impregnated foam (in the context of its use). Preferably the membrane will weather well, and will be colourable or pre-coloured and colour-stable.

Figure 3:
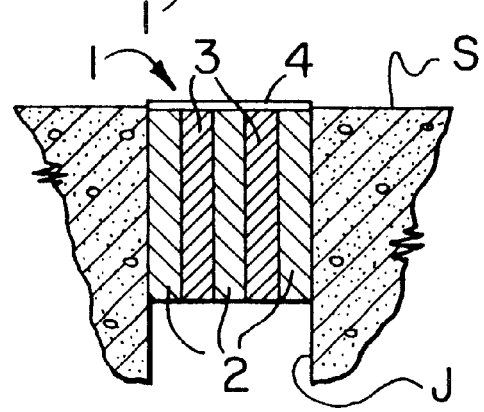
FIG. 3 is an end view of a second embodiment of the present invention.
Figure 4:
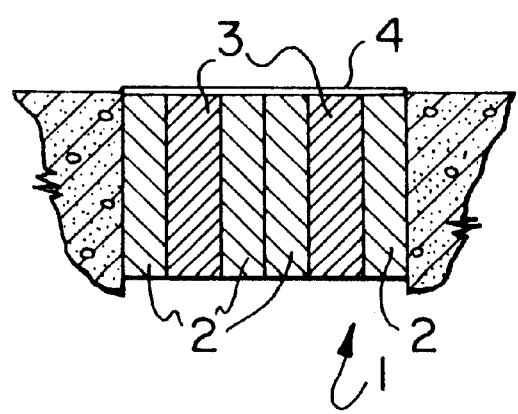
FIG. 4 is an end view of two sealant strips of FIG. 2, installed in a joint, to illustrate the use of two strips side-by-side in a joint.

Referring to FIG. 3, it will be seen that any number of layers of non-compressible foam 3 may be provided. Sufficient layers of compressible impregnated foam 2 will be provided to form an interleaved sandwich. Furthermore, as shown in FIG. 4, two sealant strips may be used in a single joint, if the joint is of too wide a nature to be filled by one strip. It will appear externally, however, as if only one strip has been installed, because the membrane sealant 4 will be continuous across the top surface of the joint.

The joint filler strip of the present invention has the effect, when installed in a joint, of breaking the joint up into a series of discrete intervals. Once the sealant membrane has been applied over the top edge of the strip, this sealant membrane will adhere to the open celled impregnated foam 2, the sides of the joint J, but not to the closed cell foam. 3. Therefore, uniform adhesion of the sealant membrane to the exposed surface elements of joint filler strip is not necessarily required and in some cases may be undesirable. This is because by adhering mainly to the open celled foam, on either side of the closed cell foam, no three point adhesion of the membrane occurs where the membrane covers the closed cell foam. The closed cell foam layers are substantially non-compressible. Therefore, when there is any movement in the joint in which the strip of the present invention has been installed, the movement will be translated by the strip of the present invention into a series of small movements equalling in sum the movement of the joint. This means that the membrane essentially bonded to the alternate layers of open celled impregnated foam will relatively freely expand and contract over the top of the closed cell foam layer to which it has not adhered. Each layer of compressible foam underneath the membrane will take up a proportionate share of the total movement, while the movement in the sealant membrane will essentially occur over the closed cell foam portions, where lack of adhesion of the sealant membrane to the closed cell foam will provide sufficient movement flexibility. Thus damage to the membrane over the closed cell foam portion will not lead to joint failure. Neither will damage to the membrane over the impregnated foam layer due its relative degree of compression as compared to the uncompressed dimension.

It has been found that the present invention functions best if a joint is cleaned thoroughly and a pressure sensitive adhesive applied to the exterior surface of the sealant strip.

It is to be understood that the examples described above are not meant to limit the scope of the present invention. It is expected that numerous variants will be obvious to the person skilled in the sealant design field, without any departure from the spirit of the present invention. The appended claims, properly construed, form the only limitation upon the scope of the present invention.

I claim:

1. In combination, a joint filler and a joint between structural elements, said joint comprising a substantially squared gap between structural elements having substantially coplanar outer surfaces, said joint being composed of opposed vertical surfaces that extend parallel to one another, and normal to the outer surfaces of the said structural elements, and said joint filler comprising:
   a) at least one inner layer of a substantially non-compressible moisture blocking material;
   b) at least two outer layers of a compressible and resilient moisture blocking material, each outer layer being in surface to surface contact with a layer of said non-compressible material; said layers of material being combined to form a strip of interleaved compressible and non-compressible layers arranged for compression at right angles to the surfaces thereof that are in contact with one another for insertion into a said joint, oriented in the joint with the layers substantially parallel to the opposed vertical surfaces thereof, said strip, in an uncompressed state, being thicker, from outermost layer to outermost layer, than the width of the joint between the squared vertical surfaces thereof.

2. A combination as described in claim 1, including a thin waterproof membrane applied over an edge of said strip of joint filler after said strip is positioned in said joint and permitted to expand to fill said joint.

3. A combination as described in claim 1, wherein, in said joint filler, said non-compressible layer is a closed cell foam formed from a plastics material.

4. A combination as described in claim 3, wherein, in said joint filler, said compressible material is an open celled cell foam.

5. A combination as described in claim 4, wherein, in said joint filler, said open celled foam is formed from a material selected from the group including polyurethane, polyvinyl copolymers, natural or synthetic rubbers or viscose sponge.

6. A combination as described in claim 5, wherein, in said joint filler, said closed cell foam is formed from a plastics material selected from the group including polyethylene foam, ethyl vinyl acetate foam, cellular, flexible, plastic extrusions.

7. A combination as described in claim 6, wherein, in said joint filler, said waterproof membrane is selected from the group consisting synthetic and natural rubbers.

8. A combination as described in claim 5, wherein, in said joint filler, said open celled foam is impregnated with an adhesive material.

9. A combination as described in claim 5, wherein, in said joint filler, said open celled foam is impregnated with an adhesive selected from the group consisting of natural and synthetic waxes, and bitumens.

10. A combination as described in claim 6, wherein, in said joint filler, said open celled foam is impregnated with an adhesive material.

11. A combination as described in as described in claim 7, wherein, in said joint filler, said open celled foam is impregnated with an adhesive material.

12. A combination as described in claim 6, wherein, in said joint filler, said open celled foam is impregnated with an adhesive selected from the group consisting of natural and synthetic waxes, and bitumens.

13. A combination as described in claim 7, wherein, in said joint filler, said open celled foam is impregnated with an adhesive selected from the group consisting of' natural and synthetic waxes, and bitumens.

14. A combination as described in claim 5, wherein, in said joint filler, the waterproof membrane is selected from the group consisting of polyurethanes, acrylics, vinyls and polysulfides.

15. A combination as described in claim 6, wherein, in said joint filler, the waterproof membrane is selected from the group consisting of polyurethanes, acrylics, vinyls and polysulfides.

16. A combination as described in claim 7, wherein, in said-joint filler, the waterproof membrane is RTV silicone rubber.

17. A combination as described in claim 9, wherein, in said-joint filler, the open celled foams impregnated with chlorinated paraffin waxes as an adhesive.

18. A combination as described in claim 5, wherein, in said joint filler, said open celled foam is impregnated with an adhesive selected from natural and synthetic resins.

19. A combination as described in claim 5, wherein, in said joint filler, said open celled foam is impregnated with an adhesive which is a latex.

20. A combination as described in claim 9, wherein, in said joint filler, the open celled foam is impregnated with an adhesive selected from the group consisting of acrylics, styrene and other vinyls.

21. A combination as described in claim 12, wherein, in said joint filler, the open celled foams impregnated with chlorinated paraffin waxes as an adhesive.

22. A combination as described in claim 6, wherein, in said joint filler, said open celled foam is impregnated with an adhesive selected from natural and synthetic resins.

23. A combination as described in claim 6, wherein, in said joint filler, said open celled foams impregnated with an adhesive which is a latex.

24. A combination as described in claim 12, wherein, in said joint filler, the open celled foam is impregnated with an adhesive selected from the group consisting of acrylics, styrene and other vinyls.

25. A combination as described in claim 13, wherein, in said joint filler, the open celled foam is impregnated with chlorinated paraffin waxes as an adhesive.

26. A combination as described in claim 7, wherein, in said joint filler, said open celled foam is impregnated with an adhesive selected from natural and synthetic resins.

27. A combination as described in claim 7, wherein, in said joint filler, said open celled foam is impregnated with an adhesive selected which is latex.

28. A combination as described in claim 13, wherein, in said joint filler, the open celled foam is impregnated with an adhesive selected from the group consisting of acrylics, styrene and other vinyls.

29. In combination, a joint filler for use in joints between structural elements, said joint being defined as a substantially squared gap between structural elements that have substantially coplanar outer surfaces, said joint composed of opposed vertical surfaces that extend parallel to one another, and normal to the outer surfaces of the said structural elements, said joint filler comprising:

a) at least one inner layer of a substantially non-compressible moisture blocking material;

b) at least two outer layers of a compressible and resilient moisture blocking material, each said outer layer being in surface to surface contact with a layer of said non-compressible material, said layers of material being combined to form a strip of interleaved compressible and non-compressible layers arranged for compression at right angles to the surfaces hereof that are in contact with one another for insertion into a said joint, oriented in said joint with the said layers substantially parallel to the said opposed vertical surfaces thereof, said strip, in an uncompressed state, being thicker, from outermost layer to outermost layer, than the width of said joint between the squared vertical surfaces thereof, and c) a thin, waterproof membrane applied over an edge of said strip after said strip is positioned in said joint and permitted to fill said joint.

* * * * *